July 28, 1925.
J. F. FOREMAN
VEHICLE SIGNAL
Filed May 18, 1923
1,547,377
2 Sheets-Sheet 1
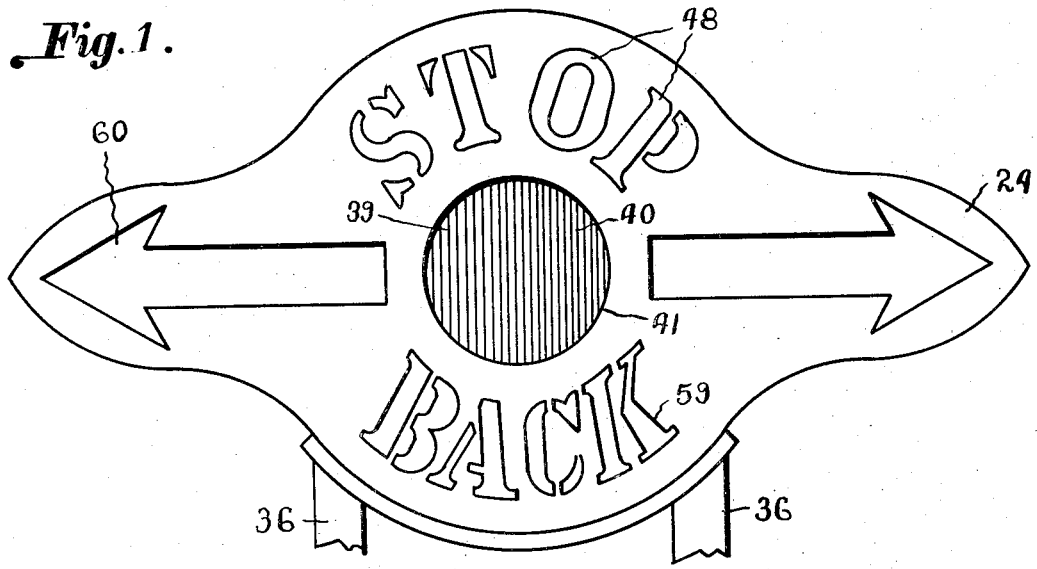
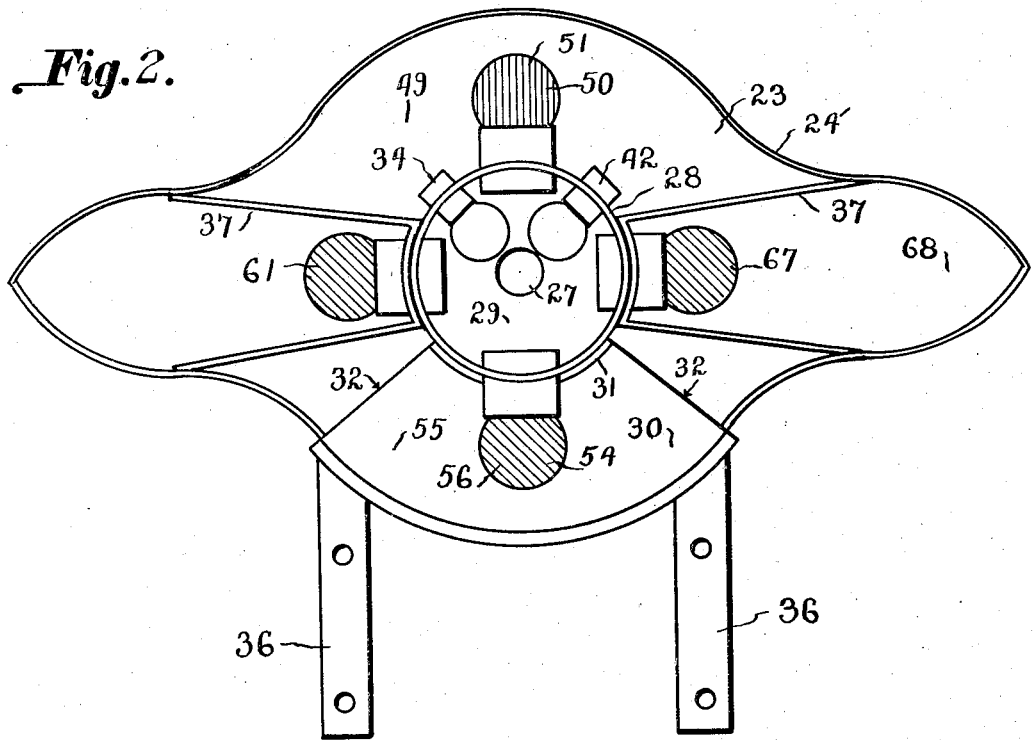
Inventor
J. F. Foreman.
By Arthur H. Sturges.
Attorney July 28, 1925.
J. F. FOREMAN
1,547,377
VEHICLE SIGNAL
Filed May 18, 1923
2 Sheets-Sheet 2
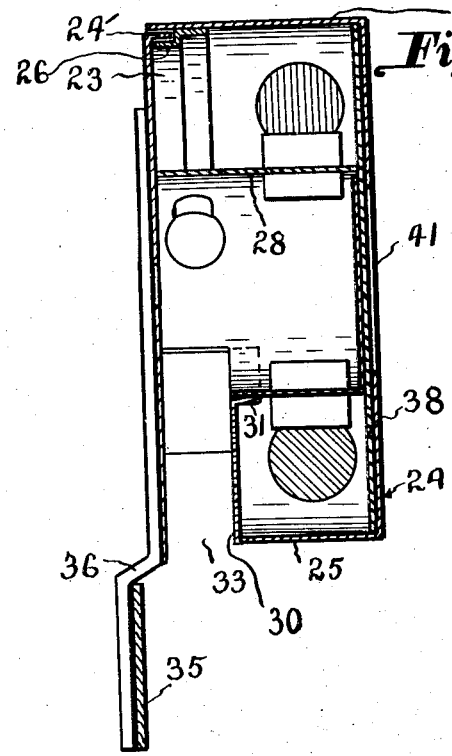
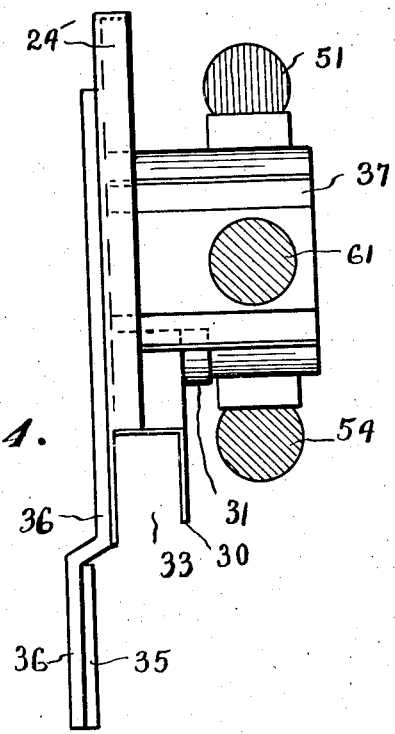
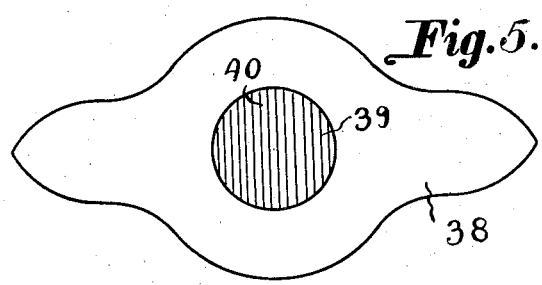
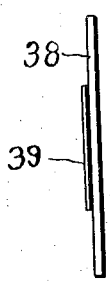
Inventor
J.F.Foreman.
By Arthur H. Sturges,
Attorney Patented July 28, 1925.

1,547,377

UNITED STATES PATENT OFFICE.

JOSEPH F. FOREMAN, OF OMAHA, NEBRASKA.

VEHICLE SIGNAL.

Application filed May 18, 1923. Serial No. 639,779.

*To all whom it may concern:*

Be it known that I, JOSEPH F. FOREMAN, a citizen of the United States, residing at Omaha, in the county of Douglas and State of Nebraska, have invented certain new and useful Improvements in Vehicle Signals, of which the following is a specification.

The present invention relates to improvements in vehicle signals and has for an object to provide for announcing intended changes in direction to the left or right at intersecting streets, to further announce when it is proposed to slow down and to stop or to back the vehicle.

A further object of the invention is to provide an economical construction visible clearly by day or night.

With the foregoing and other objects in view, the invention will be more fully described hereinafter, and will be more particularly pointed out in the claims appended hereto.

In the drawings, wherein like symbols refer to like or corresponding parts throughout the several views:—

Figure 1 is a face view of the signal.

Figure 2 is a face view of the signal with the cover removed.

Figure 3 is a transverse section along the medial line of the signal.

Figure 4 is a side view with the cover removed.

Figure 5 is a face view of a light diffusing element employed, and

Figure 6 is an edge view of the same.

The signal consists of a metal housing 23 having a suitably secured cover 24 more described below.

The housing is subdivided into six compartments, in a light tight manner, in order that the light from one compartment will not penetrate to the others.

As best shown in Figures 2, 3 and 4 the rear wall of the housing 23 is provided with a flange 24' which circumscribes the housing wall 23 and is adapted to be received within a recess formed by the walls 25 of the cover 24, and a flange 26 soldered to it, thus effecting a weather tight closure.

The rear wall 23 is provided with a hole 27 through which the conducting wires for the various light bulbs may be passed. A metal round band 28 is soldered to the rear wall 23, thus forming a circular compartment 29. A segmental shaped piece 30 is now secured to the ring 28 at its flange 31 and to the rear wall 23, at 32 where the segmental piece has a right angle bend. This arrangement forms an open ended chute, open at its bottom 33 as shown in Figure 3, the chute or duct leading to, and in communication with, the circular compartment 29.

A tail light bulb 34 will illuminate the compartment 29 and the light will be projected down through the duct 33 onto the license plate numbers 35. This plate is supported by strap irons 36.

The housing is further divided into four other compartments by means of horizontally-turned substantially U-shaped separating walls 37 suitably secured to the ring 28 and rear wall 23 in a manner adapted to prevent light from one compartment penetrating into another. Each compartment is provided with a light bulb for purposes later explained.

A member 38 of substantially transparent material such as celluloid (shown in Figure 5) is cut to the same shape as the housing and as shown in Figure 3 is adapted to be received between the cover 24 and the edge of the ring 28 and the edge of the divisional wall members 37. The center of the member 38 is provided with a red colored disk of celluloid 39 as shown by the vertical lines 40 denoting red color. The disk is larger in diameter than the round opening 41 provided in the cover plate 24 in order that the tail light 34 will function not only to light up the member plate 35 with a white light, but will also flash a red warning signal rearwardly through the red disk 39.

The bulb 34 is of more candle power for traveling purposes, than its mate 42 in the compartment 29, which is used for parking purposes only, and is for the purpose of saving battery currents, but illuminating the red disk 39 and license plate 35 the same as bulb 34 when in use.

The signal is adapted to display the words "Stop" or "Slow" as a warning signal, the word "Back" and arrows for indicating intended right and left turns; while the right or left turn will be simultaneously indicated at the front of the vehicle as follows:

The word "Stop" or "Slow" is cut into the cover 24 as shown at 48 and the light from the compartment 49 will shine through the celluloid 38 from the bulb 50 showing a red colored warning to a vehicle driven in the rear, by means of the glass if the bulb 50 being of red color, as shown by the vertical lines 51 which denote red color.

The bulb 54 in compartment 55 is of green color as indicated by the color denoting lines 56.

In Figure 5 the celluloid employed is transparent originally, but is treated as follows: The entire surface is scoured with sand paper thereby making it white in color or appearance. This treatment has the effect of rendering the material somewhat slightly opaque, with the result that the light is diffused evenly over the surface in a manner to light up the entire arrow or indicia. Of course the red colored center 39 need not be scarified or sanded.

The cover 24 and its side walls 25 may be retained by the rear wall 23 in any suitable manner such as the flanges 24 and 26 (Figure 4).

I do not wish to be restricted to the size, form, and proportions of the various parts, and obviously changes could be made in the construction herein described without departing from the spirit of the invention, it being only necessary that such changes fall within the scope of the appended claims.

What is claimed is:—

1. A signal comprising a housing having a central cylindrical wall providing therein a central compartment, a segmental plate secured to the lower side of said cylindrical wall and depending therefrom in spaced relation to the front wall of the housing, said plate having rearwardly bent flanges at opposite ends to space the plate from the rear wall of the housing and the latter and said circular wall being cut away at their lower portions between the plate and said rear wall to provide a duct, a tail light bulb mounted in one side of said central compartment for illuminating the same and projecting light downwardly through said duct, means for supporting a license tag across the lower end of the duct, partition members carried upon the exterior of the annular wall and dividing the housing into a number of outer compartments, the front wall having signal indicia opposite the separate compartments, and light bulbs mounted in said annular wall and projecting into said compartments for separately illuminating the same.

2. A signal comprising a housing, an annular wall arranged concentrically within the housing and providing a central compartment, partitions mounted on the outer side of the annular wall and dividing the housing into a number of outer compartments, a depending partition carried by the annular wall and arranged crosswise in the housing and in spaced relation to the rear wall thereof to form a duct through the bottom of the housing, said annular wall being apertured at the top of the duct and communicating therewith, and a plurality of light bulbs mounted upon the inner and outer sides of said annular wall and projecting respectively into the central and outer compartments for illuminating the same.

In testimony whereof, I have affixed my signature in presence of two witnesses.

JOSEPH F. FOREMAN.

Witnesses:
ARTHUR H. STURGES,
HIRAM A. STURGES.